(12) United States Patent
Illedits et al.

(10) Patent No.: US 7,300,237 B2
(45) Date of Patent: Nov. 27, 2007

(54) SELF-LOCKING BOLTED FASTENER

(75) Inventors: Thomas Illedits, Neufeld (AT); Hubert Holzl, Reisenberg (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 11/268,376

(22) Filed: Nov. 7, 2005

(65) Prior Publication Data
US 2006/0110234 A1    May 25, 2006

(30) Foreign Application Priority Data
Nov. 22, 2004    (EP) .................................. 04405720

(51) Int. Cl.
*F16B 39/00*    (2006.01)
(52) U.S. Cl. ................... 411/166; 411/398; 411/539; 411/238
(58) Field of Classification Search .............. 411/238, 411/275, 147, 166, 169, 398, 539; 280/86.753
See application file for complete search history.

(56) References Cited

U.S. PATENT DOCUMENTS

| | | | | |
|---|---|---|---|---|
| 924,259 | A * | 6/1909 | Mills | 411/143 |
| 966,949 | A * | 8/1910 | Posson | 238/262 |
| 986,539 | A * | 3/1911 | Battin | 411/147 |
| 1,020,178 | A * | 3/1912 | Battin | 411/132 |
| 2,890,893 | A * | 6/1959 | Laukhuff | 280/86.756 |
| 3,072,423 | A * | 1/1963 | Charlton | 403/83 |
| 3,072,426 | A * | 1/1963 | Gilbert | 403/115 |
| 3,124,370 | A * | 3/1964 | Traugott | 280/86.756 |
| 3,511,289 | A * | 5/1970 | Coyle | 411/347 |
| 3,880,444 | A * | 4/1975 | Bridges | 280/86.753 |
| 3,973,611 | A * | 8/1976 | Profit | 411/273 |
| 4,077,142 | A * | 3/1978 | Klett et al. | 37/449 |
| 5,158,409 | A * | 10/1992 | Ishida | 411/107 |
| 5,848,874 | A * | 12/1998 | Heumann et al. | 415/189 |
| 6,009,770 | A | 1/2000 | Och | |
| 6,345,945 | B1 * | 2/2002 | Hildebrandt | 411/369 |
| 6,688,616 | B1 * | 2/2004 | Ziech | 280/86.751 |
| 6,758,646 | B1 * | 7/2004 | Ishida | 411/119 |
| 7,037,027 | B2 * | 5/2006 | Steinbeck | 403/408.1 |

FOREIGN PATENT DOCUMENTS

| | | |
|---|---|---|
| DE | 8609005 A1 | 5/1986 |
| DE | 10060963 A1 | 6/2002 |

\* cited by examiner

*Primary Examiner*—Flemming Saether
(74) *Attorney, Agent, or Firm*—Schweitzer Cornman Gross & Bondell LLP

(57) ABSTRACT

A bolted fastener for joining components, such as a bracket fastened to a crosspiece, includes a bolt, a nut and an eccentric. A square neck of a bolt fits into an oblong hole in a component and prevents the bolt from turning. The diameter of the eccentric that serves as a wedging means fits into the slightly larger diameter of the receptacle hole, allowing the eccentric to fit into the receptacle hole. When the nut is screwed on the bolt, the eccentric rotates about the bolt and, on account of its eccentricity, wedges itself within the receptacle hole. The wedged eccentric prevents accidental loosening or accidental unscrewing of the nut.

7 Claims, 6 Drawing Sheets

SELF-LOCKING BOLTED FASTENER

The invention relates to a self-locking bolted fastener to join components by means of at least one bolt and by means of at least one nut, wedging means being provided to prevent rotation.

BACKGROUND OF THE INVENTION

From published patent application DE 100 60 963 A1 a bolted fastener with wedging means has become known, the wedging means serving to prevent rotation. A bolt holds two components together. The head of the bolt rests against the base of a round hole arranged in a component. The axis of the round hole is offset from the axis of the bolt by an eccentricity. Wedging means rest against the head of the bolt and against the inside surface of the round hole. When the bolt is screwed in, the wedging means are increasingly jammed between the head of the bolt and the inside surface, the bolt being thereby held and made insensitive to vibrational and lateral forces.

A disadvantage of the known device is that a round hole that is eccentric to the threaded hole is required. Also, a wedging means in the form of a block with a seating surface and thread is relatively costly.

The present invention sets out to provide a remedy to the disadvantages of the prior art. The invention avoids the disadvantages of the known device and is a self-locking bolted fastener that is easy to install.

BRIEF DESCRIPTION OF THE INVENTION

The fastener of the present invention comprises the combination of a bolt, a mating nut, and an eccentric wedge means that is placed within a hole of one of the components to be joined together. The eccentric has a hole through which the bolt passes, the hole being located on the eccentric to rotate within the component hole in which it sits as the nut is tightened down on the bolt, wedging against the component hole and preventing rotation or loosening of the fastener.

With the eccentric fastener according to the invention easy assembly with few parts is possible and valuable work time can thereby be saved. Additional drilling operations or positive-fit wedging means with seating surfaces are obviated.

The eccentric fastener according to the invention is easier, cheaper, and less complicated to manufacture than comparable bolted fasteners with wedging means. Faster and easier assembly and disassembly, as well as the use of fewer parts, are economically advantageous. The assembly work and assembly process of an escalator or other construction are thereby substantially shortened.

BRIEF DESCRIPTION OF THE DRAWINGS

The present invention is explained in more detail in the following description of a preferred illustrative embodiment, with reference to the attached figures, wherein.

DETAILED DESCRIPTION OF THE INVENTION

Figure 1:
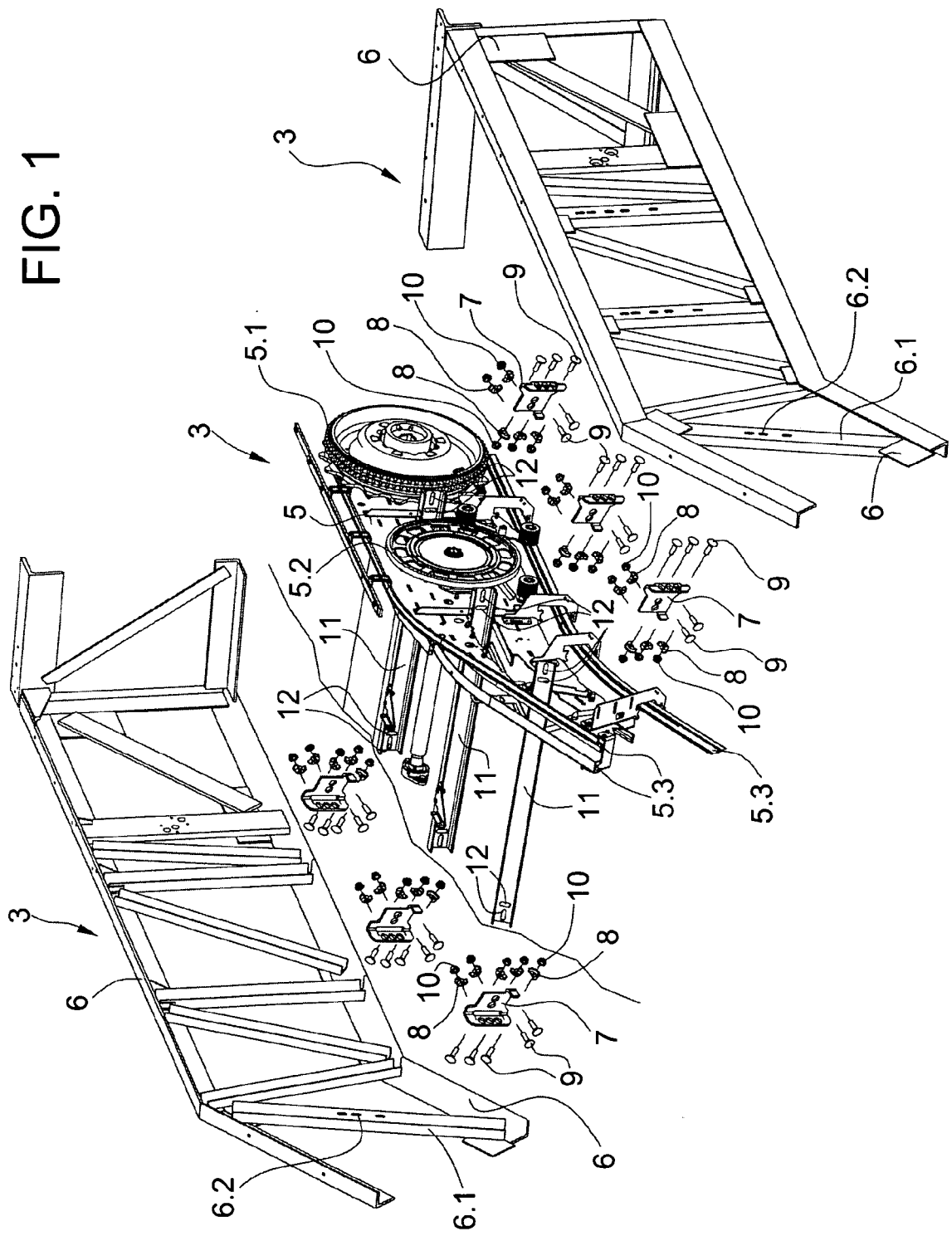
FIG. 1 is a perspective view of an upper headpiece of an escalator with a truss with which the invention may be employed.

FIG. 1 shows an upper head-piece 3 of an escalator or moving walk with rail block 5 and truss 6. The rail block 5 comprises a drive wheel 5.1 for driving a chain-band of the steps or pallets, a drive wheel 5.2 for driving the handrail, and guiderails 5.3 for guiding the step rollers or pallet rollers.

The rail block 5 is fastened by means of bolted fasteners to the truss 6. A bracket 7 serves as the connecting part between the rail block 5 and truss 6. The bracket 7 is fastened by means of bolts 9, nuts 10, and eccentric elements 8 to the rail block 5 and crosspieces 11 having oblong holes 12, and to truss struts 6.1 having oblong holes 6.2. The self-locking positive-fit joint that thereby results forms a compact, durable, adequately dimensioned force interface. Additional welding or pinning operations are obviated. When the bolts 9 and nuts 10 are tightened, the eccentrics 8 turn and become positive-fitting and tight in the bracket receptacle holes 7.2.

With the fastener according to the invention, valuable work time can be saved. The fastener is easier, cheaper, and less complicated to manufacture than conventional fastener systems. Welding, cleaning with chipping hammer and wire brush, as well as drilling and hammering dowel-pins into place are obviated.

Further components (for example a comb plate or balustrade) of the escalator or moving walk can also be fastened together by means of such bolts 9, eccentrics 8 and nuts 10.

Figure 2:
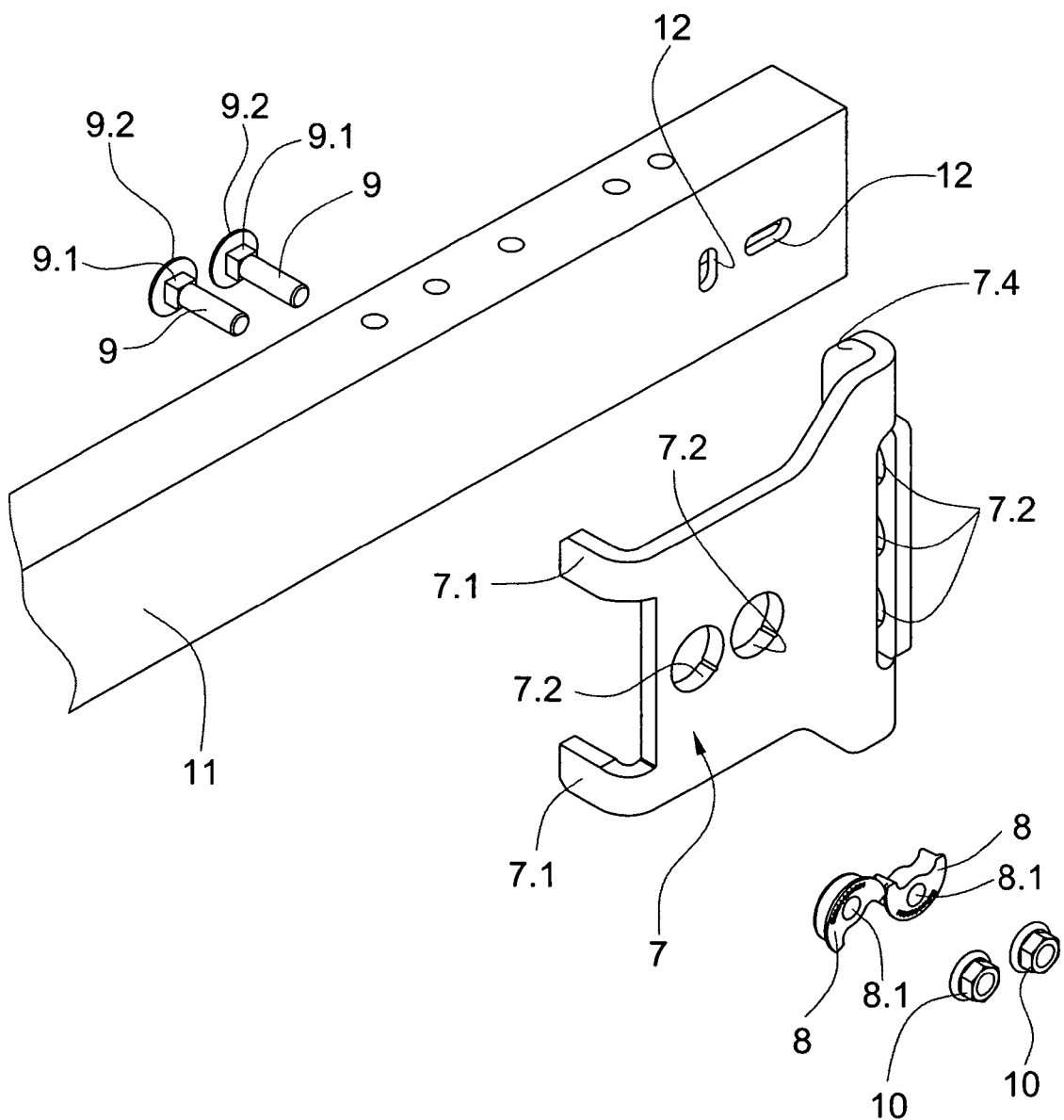
FIG. 2 is a perspective view of a bolted fastener according to the invention before assembly with components to be connected.

FIG. 2 shows in exploded view the bolted fastener according to the invention that is fastening the bracket 7 to the crosspiece 11. Arranged in the crosspiece 11 are a crosswise oblong hole 12 and a lengthwise oblong hole 12. The oblong holes 12 can also be arranged to be tilted or sloping. The square neck 9.1 of a bolt 9 fits into the oblong hole 12 and is dimensioned to prevent the bolt 9 from turning. The head 9.2 rests against the crosspiece 11 at the top of the hole 12. The bracket 7 has lugs 7.1 that serve to center the bracket 7 on the crosspiece 11. Also provided in the bracket 7 are receptacle holes 7.2. The diameter of the eccentric element 8 that acts as a wedging means, hereinafter referred to as "the eccentric" 8, is such that the eccentric 8 fits within the slightly larger diameter of the receptacle holes 7.2, such that the eccentrics 8 fit into the receptacle holes 7.2. Provided on the end face 7.4 of the bracket 7 are further receptacle holes 7.2 that serve to fasten the bracket 7 to, for example, the strut 6.1 in FIG. 1.

Figure 3:
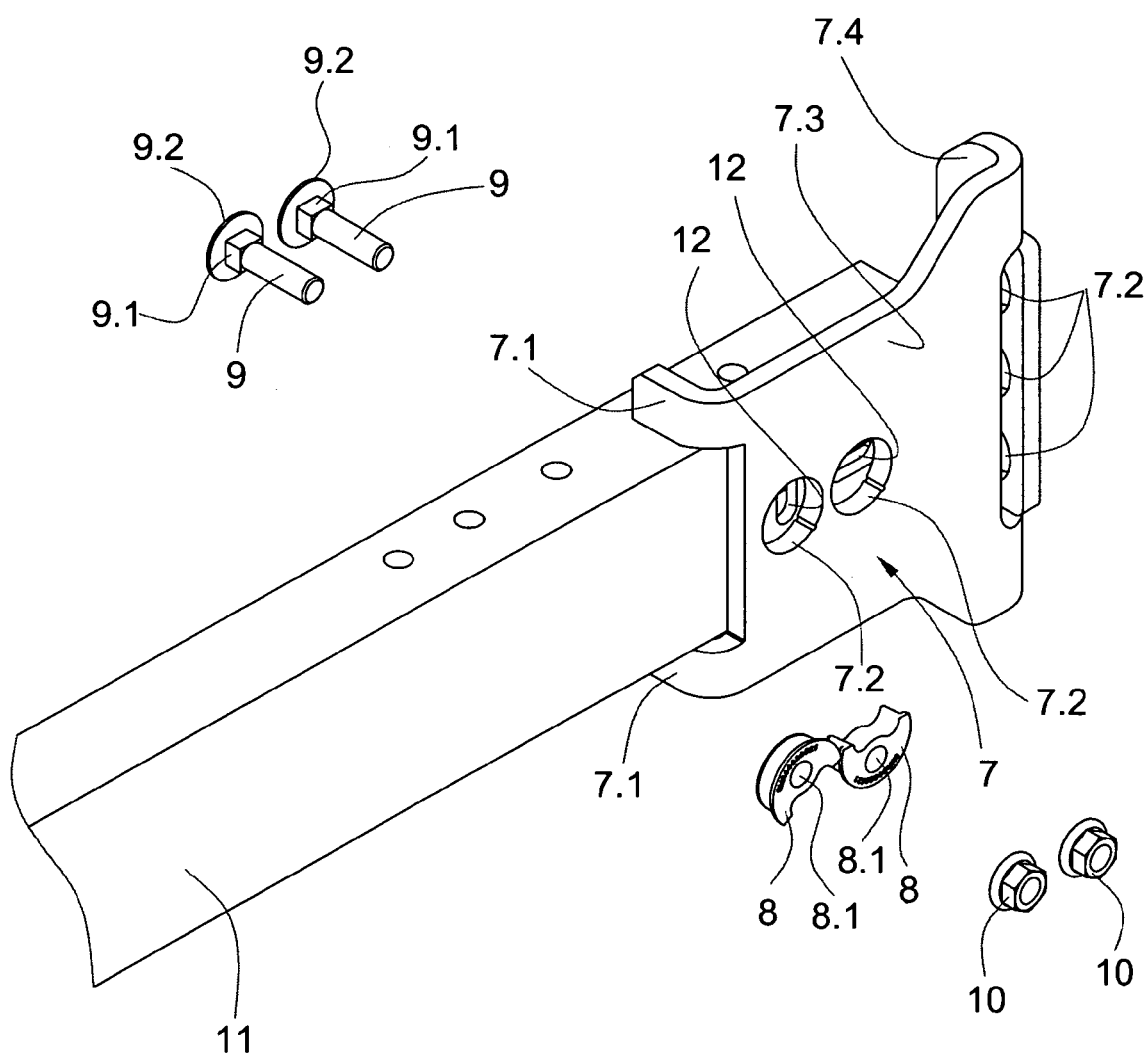
FIG. 3 is a perspective view of the fastener and components of FIG. 2 during assembly.

FIG. 3 shows the bracket 7 positioned on the crosspiece 11, the receptacle holes 7.2 being aligned with the oblong holes 12.

Figure 4:
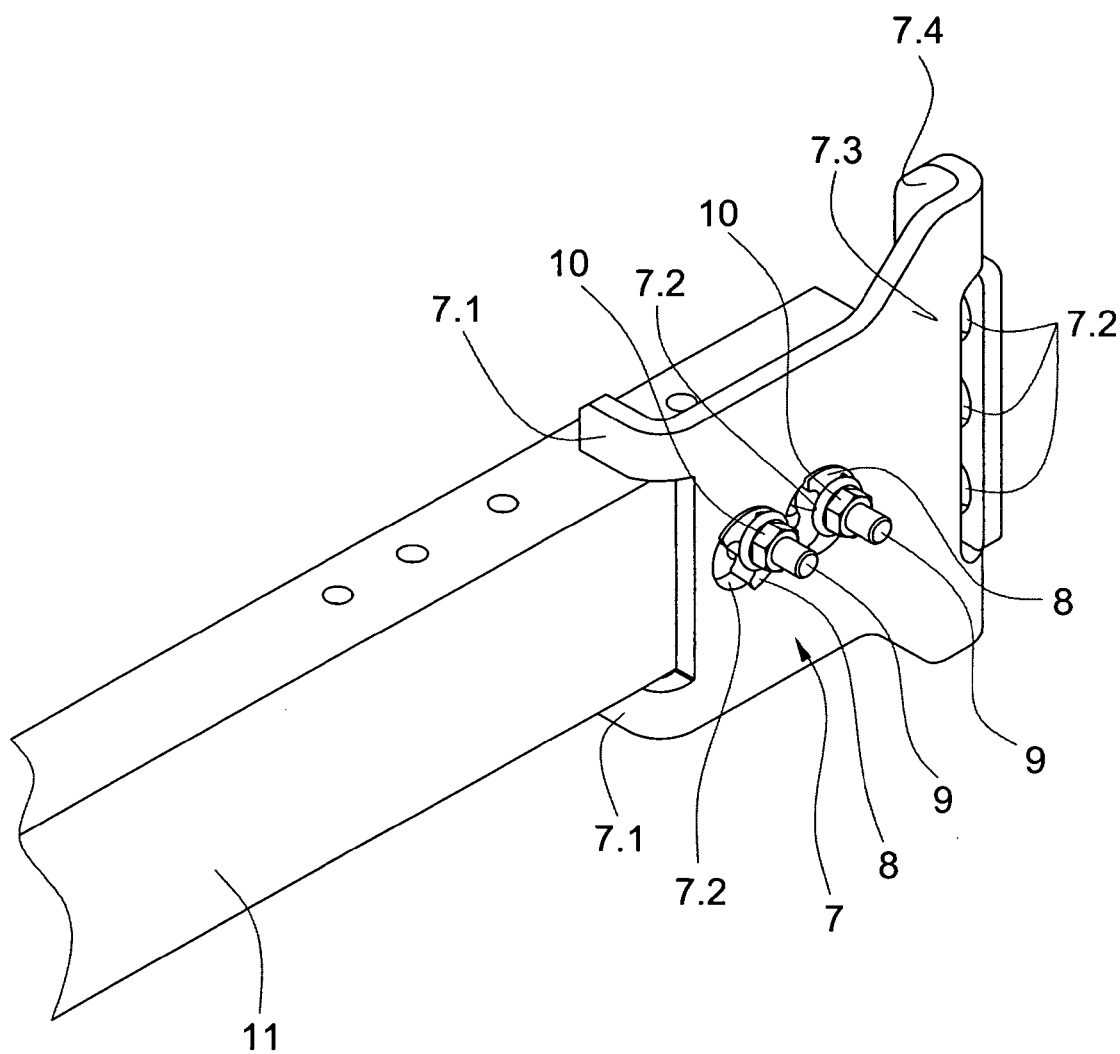
FIG. 4 is a perspective view of the fastener and components of FIG. 2 after assembly.

FIG. 4 shows the bracket 7 completely mounted on the crosspiece 11. The eccentrics 8 have been inserted into the receptacle holes 7.2. The bolts 9 penetrate through the oblong holes 12 as well as the round holes 8.1 of the eccentrics 8 in the receptacle holes 7.2. The nuts 10 have been screwed onto the bolts 9 and tightened. Tightening the nuts 10 has caused the eccentrics 8 to be turned with frictional engagement and positive fit in their receptacle holes 7.2. On account of the eccentricity of the eccentric 8 relative to the bolt 9, and of the eccentric's round hole 8.1 relative to the receptacle hole 7.2, a self-locking bolted joint is created.

Figure 5:
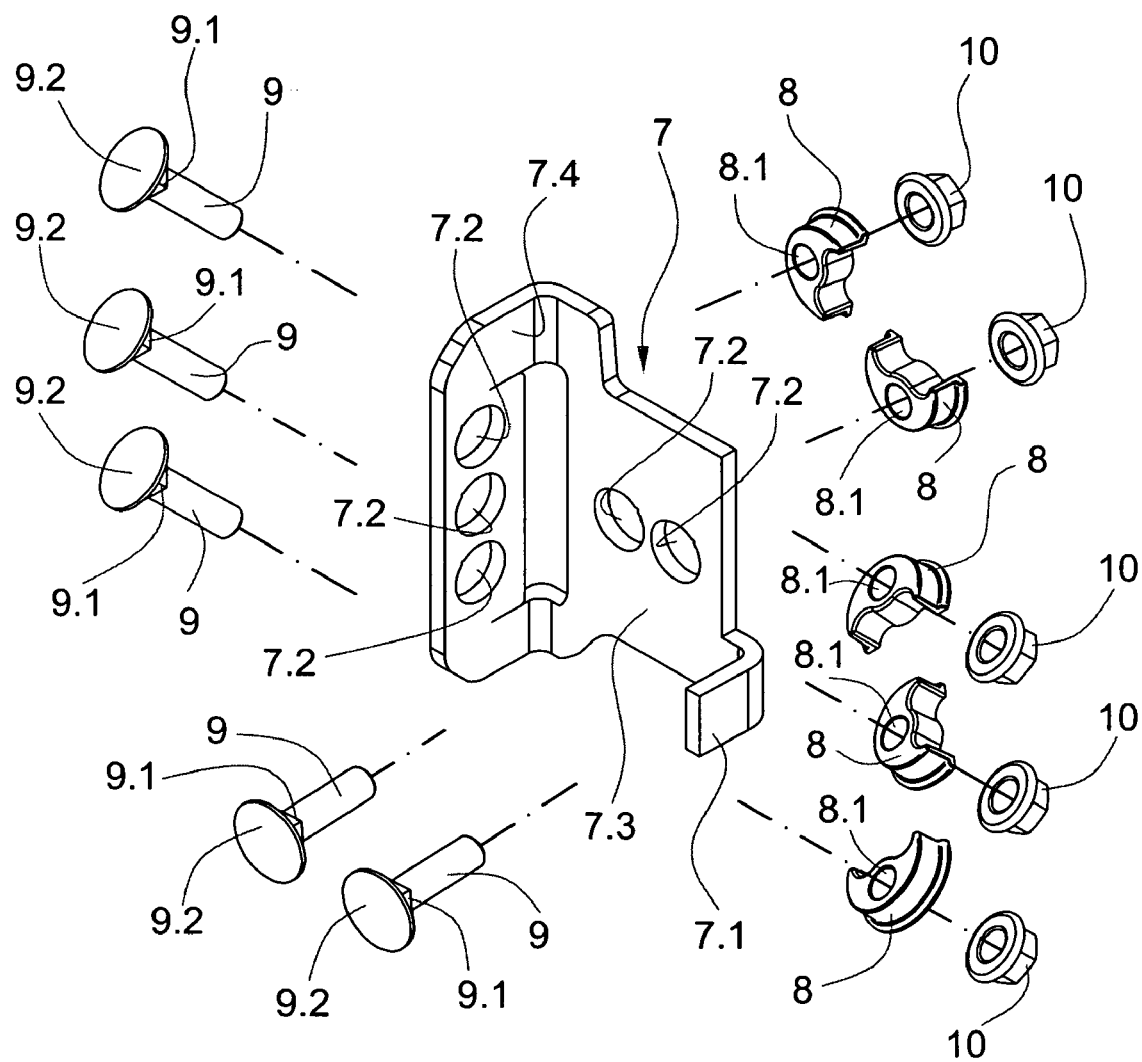
FIG. 5 is a perspective view of a bracket assembly incorporating the invention.

FIG. 5 shows details of the angle-shaped bracket 7 comprising a first arm 7.3 with lug 7.1 and a second arm 7.4. In the first arm 7.3 are two receptacle holes 7.2 for bolted fastening to the crosspiece 11 and in the second arm 7.4 are three receptacle holes for bolted fastening to the strut 6.1. Bracket 7, bolts 9, eccentrics 8, and nuts 10 form a self-locking bolted joint to the crosspiece 11, and to the strut 6.1, of the truss 6 as described above.

Figure 6:
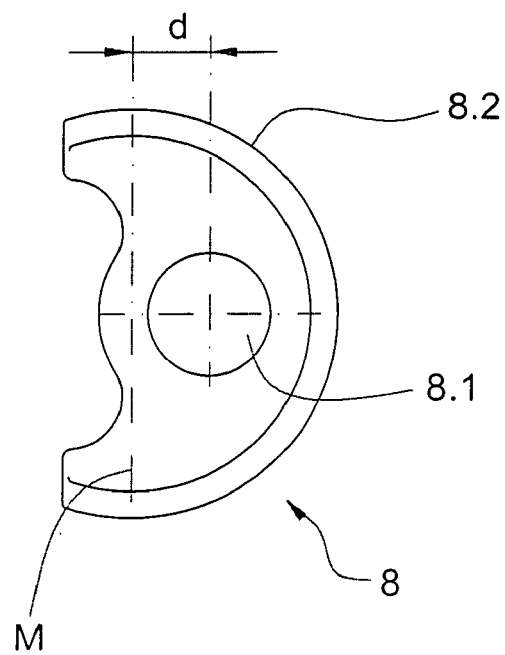
FIGS. 6 and 6a are detailed views of an eccentric element used in the invention.
Figure 6A:
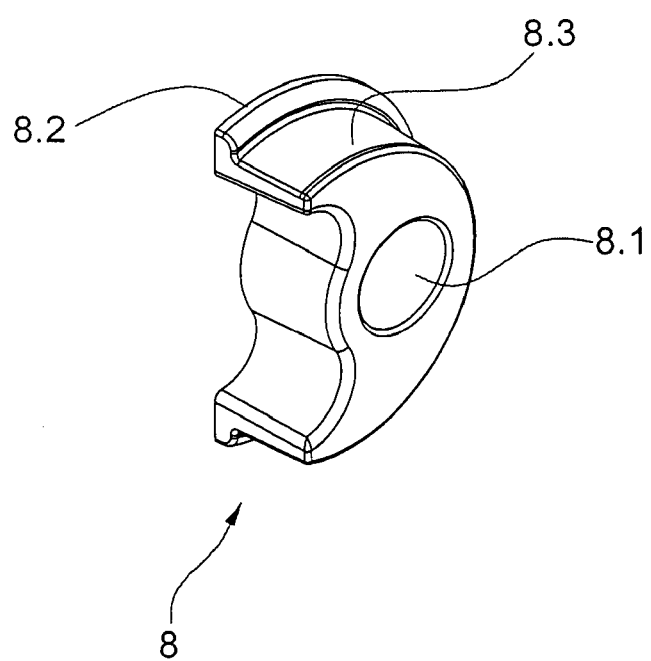

FIG. 6 shows details of the eccentric 8. The eccentric 8 has essentially the form of a half-cylinder with a peripheral flange 8.2 serving as a stop at one end, the eccentric's sheath or outer surface serving as sliding surface 8.3 that slides when inserted into, and turned in, the receptacle hole 7.2. The flange 8.2 prevents the eccentric 8 from entering completely into, or passing completely through, the receptacle hole 7.2, in that the flange 8.2 rests against the surface of the bracket surrounding the circumference of the receptacle hole 7.2. The axis of symmetry of the eccentric is indicated by the line M. The center of the eccentric round hole 8.1 is offset by the distance d from the axis of symmetry of the eccentric M, the axis of symmetry of the eccentric M being aligned with the axis of symmetry of the receptacle hole 7.2. When the nut 10 is screwed on or tightened, the eccentric 8, acting as a wedging means, turns about the bolt 9 and, on account of its eccentricity, wedges itself into the receptacle hole 7.2. The wedged eccentric 8 prevents accidental loosening or accidental unscrewing of the nut 10.

The crosspiece 11 and strut 6.1 can also be fastened to the bracket 7 with only one bolt 9, one eccentric 8, and one nut 10. The crosspiece 11 and strut 6.1 can also be joined directly without the bracket 7. The receptacle holes 7.2 are then arranged in one of the two struts.

The bolted fastener according to the invention can also be used for joining components in devices other than escalators or moving walks such as, for example, elevators, aerial cableways, cable railways, hoisting equipment, and machines.

We claim:

1. A self-locking bolted fastener system for joining components, comprising a bolt, a mating nut, first and second components to be fastened together, each of said components having a mounting hole for passage of the bolt, and an eccentric element for preventing relative rotation between the bolt and nut upon tightening, the mounting hole in the second component being circular and dimensioned to accommodate the eccentric element, the eccentric element being in the form of a half cylinder and being mounted in the mounting hole of the second component and having a hole for passage of the bolt offset from an axis of symmetry of the eccentric element and with a sliding surface for wedging engagement with a wall of the second component mounting hole.

2. The bolted fastener system according to claim 1, wherein the axis of symmetry of the eccentric element is aligned with an axis of symmetry of the mounting hole in the second component.

3. The bolted fastener system according to claim 1 or 2, characterized in that the eccentric element has a first end bearing a flange that rests against a surface of the second component about a circumference of the mounting hole in the second component.

4. The bolted fastener system according to claim 3 wherein the components are a crosspieces and a truss.

5. The bolted fastener system according to claim 3 wherein the components are elements of an escalator or moving walk.

6. The bolted fastener system according to claim 1 wherein the components are a crosspieces and a truss.

7. The bolted fastener system of claim 1 wherein the mounting hole of the first component is elongated and the bolt has a square head portion for engagement with sides of the elongated mounting hole to restrain the bolt from rotation when the square head portion extends through the mounting hole of the first component.

* * * * *